UNITED STATES PATENT OFFICE.

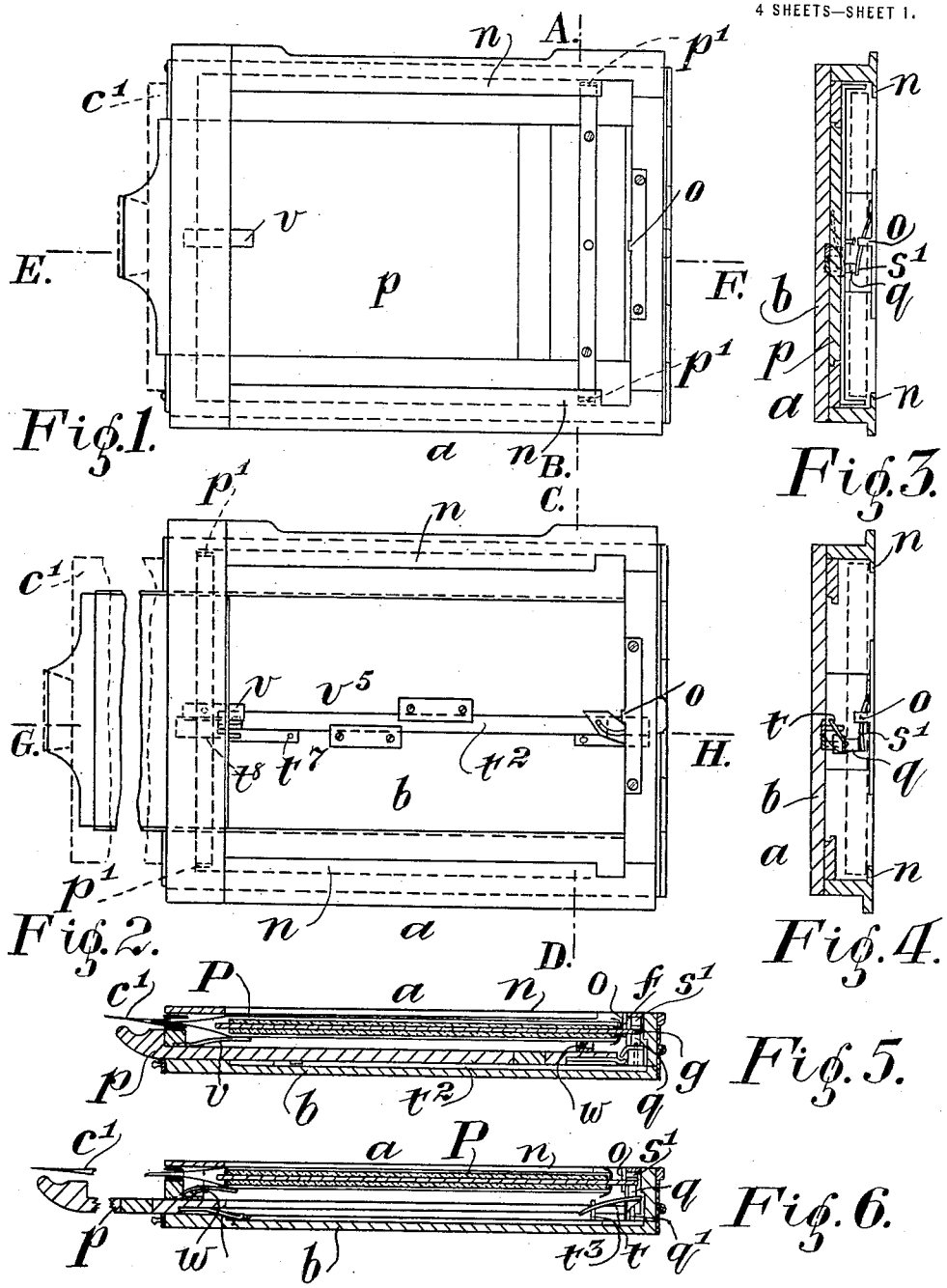

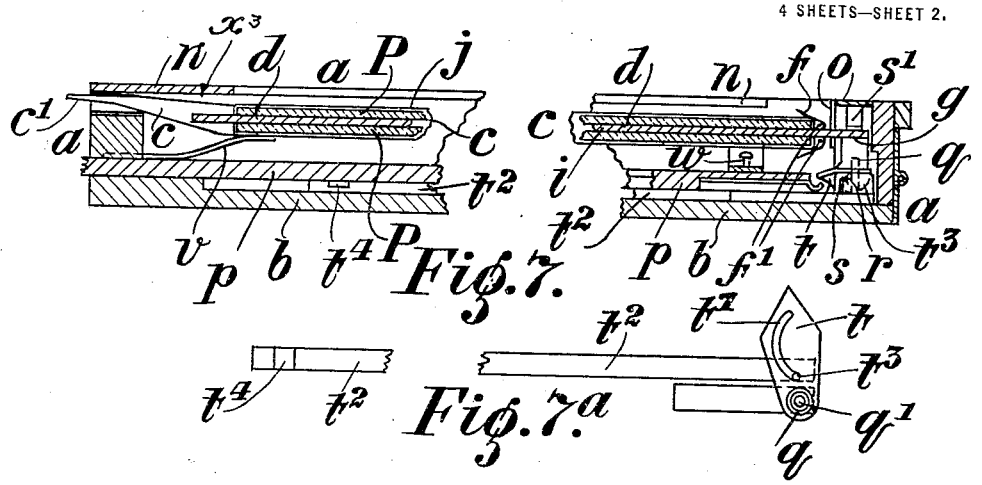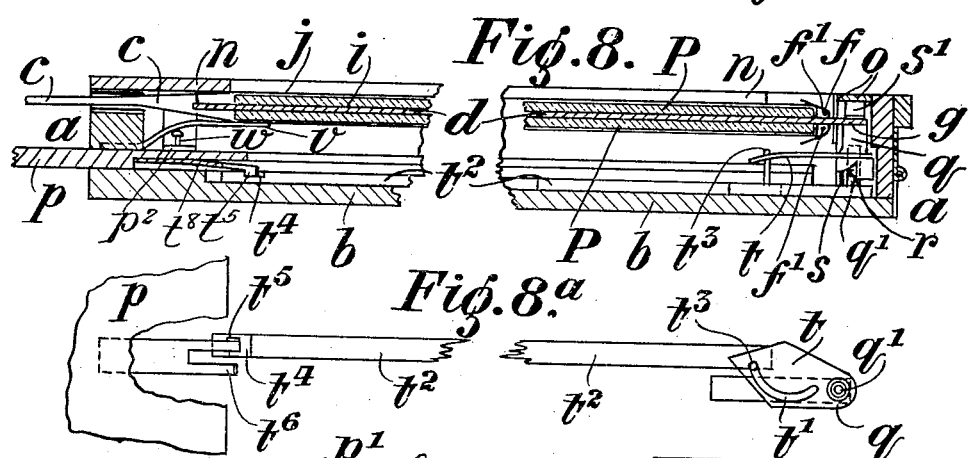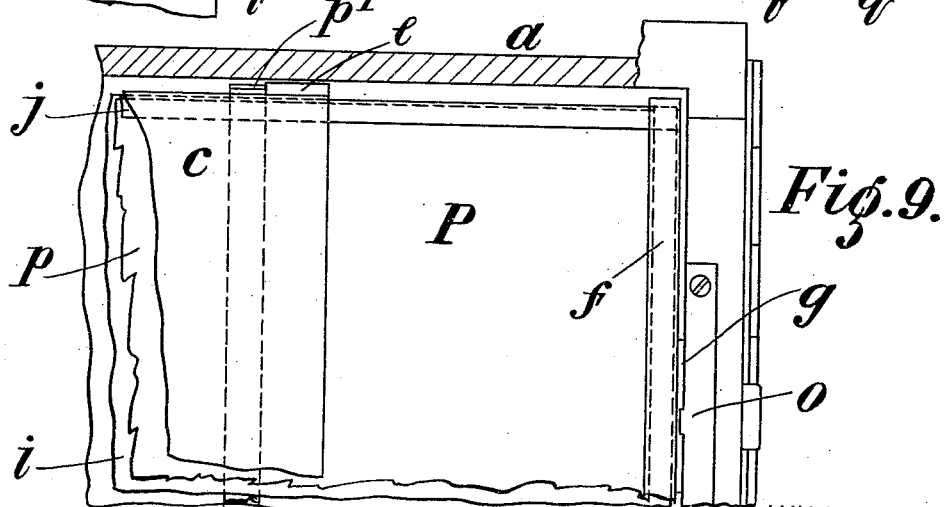

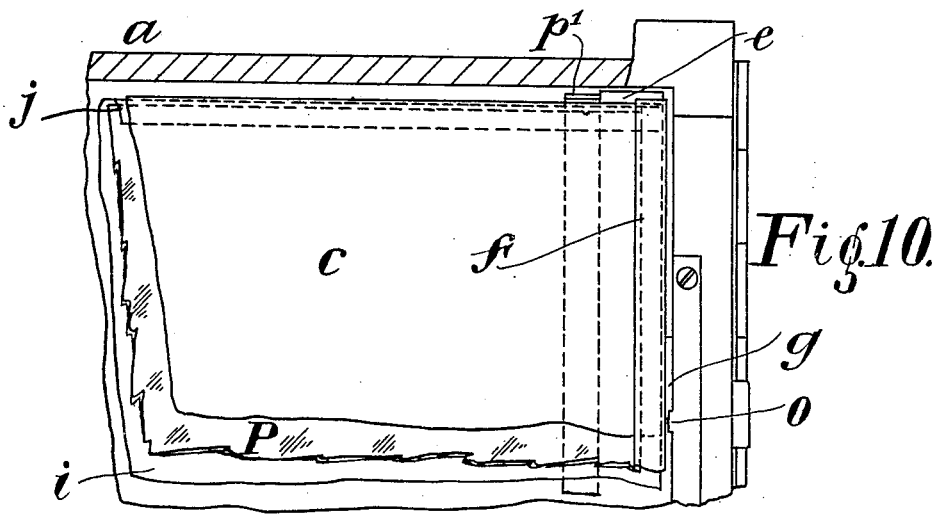
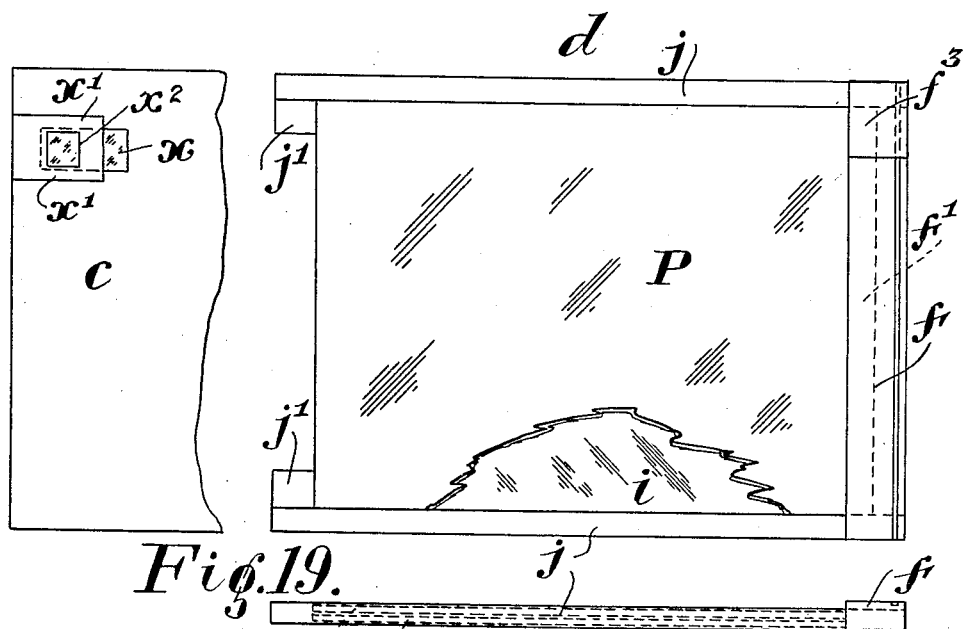

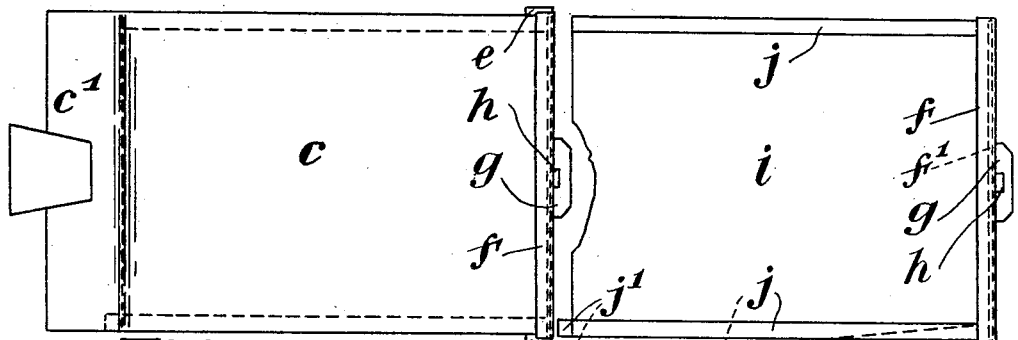

JAMES DONALD, OF GLASGOW, SCOTLAND.

DAYLIGHT-LOADING PHOTOGRAPHIC DARK SLIDE.

1,158,902.  Specification of Letters Patent.  Patented Nov. 2, 1915.

Application filed August 25, 1914. Serial No. 858,432.

*To all whom it may concern:*

Be it known that I, JAMES DONALD, a subject of the King of Great Britain, residing at Glasgow, Scotland, have invented certain new and useful Improvements in and Connected with Daylight-Loading Photographic Dark Slides, of which the following is a specification.

This invention relates to what are known as daylight loading photographic dark slides and to the envelops or holders for the sensitized plates or their equivalent for use in connection with such slides and its object is to improve and simplify their construction.

Under my invention the dark slide consists of a suitable framework somewhat longer than the sensitized plate or its equivalent to be used, capable of being inserted in the camera in any well known manner and having fitted thereto a hinged back, which when closed, constitutes along with the framework a hollow receptacle for the plate envelop or holder which comprises two parts, an outer part consisting of a wrapper of suitable material, as opaque or non-actinic paper, somewhat longer than the plate or its equivalent and an inner part made of cardboard or the like which constitutes a stiff or rigid support for the plate or its equivalent. The dark slide is provided with means for retaining the plate support in place and it is also provided with automatic means for moving or adjusting the plate support so as to permit of the free operation of the dark slide.

The outer part of the envelop or holder is so arranged that it can be moved with the shutter of the dark slide when said shutter is opened, to uncover a sensitized plate or its equivalent for exposure while, when the shutter is closed, after exposure, the movement of the shutter causes the outer part of the envelop or holder to be moved also, for the purpose of again covering the inner part or support for the plate or its equivalent.

In order that my said invention may be properly understood I have hereunto appended four explanatory sheets of drawings whereon, by way of illustration or example, one construction of dark slide and various constructions of envelops or holders for use in connection with the slide are shown.

On the drawings: Figure 1 is a front view of a dark slide with the shutter closed. Fig. 2 is a similar view with the shutter open. Fig. 3 is a cross section of the slide taken on the line A, B, Fig. 1. Fig. 4 is a similar view taken on the line C, D, Fig. 2. Fig. 5 is a longitudinal section taken on the line E, F, Fig. 1, and Fig. 6 is a similar view taken on the line G, H, Fig. 2. Figs. 7 and 8 are similar views to Figs. 5 and 6 but to a larger scale the center portion being broken away. Figs. 7$^a$ and 8$^a$ are detail views of the lever $t^2$ and its connections. Figs. 9 and 10 are sectional views to a larger scale of part of the dark slide with the envelop or holder shown therein. Fig. 11 is a front view of the envelop with one form of holder therein. Fig. 12 is a front view of the form of holder shown in Fig. 11. Fig. 13 is a vertical section through the holder shown in Fig. 12, but with the photographic mediums therein, while Fig. 14 is a horizontal section through the same but without the mediums therein. Fig. 14$^a$ is a front view of a slightly modified form of inner part or support $d$ of the plate holder. Fig. 15 shows a front view and Fig. 16 a plan view of another form of inner part or support $d$, and Figs. 17 and 18 are views of yet another form of inner part or support $d$. Fig. 19 is a front view of another modification of the envelop and holder. Fig. 20 is a plan view, Fig. 21 a sectional plan view, and Fig. 22 an enlarged sectional view of the holder shown in Fig. 19.

Referring to the drawings: In carrying out my invention the dark slide consists of a suitable frame-work $a$ somewhat longer than the sensitized plate or its equivalent to be used, capable of being inserted in the camera in any well known manner and having fitted thereto a hinged back $b$, which, when closed, constitutes along with the frame-work $a$ a hollow receptacle for the plate envelop or holder.

For the purpose of clearness I will first describe the construction of various forms of plate envelops or holders and thereafter I will more fully describe the construction of the dark slide.

As illustrated at Figs. 11 to 14 the plate envelop or holder is made of any suitable material but preferably of opaque paper, or non-actinic paper, for cheapness, and comprises two parts, an outer part $c$ consisting of a wrapper somewhat longer than the plate or its equivalent P and an inner part $d$ made of cardboard or the like which constitutes a stiff or rigid support for the plates or their equivalent. The outer part or wrapper $c$ of the envelop or holder is closed at one end and open at the other end and is provided on the edges at the open end with two projections or catches $e$ the object of which will be hereinafter explained. The inner part or support $d$ which, as shown, carries two plates or their equivalent, though it may be arranged to carry only one, is capable of being pushed into the open end of the outer part or wrapper $c$ and is provided at one end with a folded or bent strip $f$ of the same material of which the outer part or wrapper is formed, the extremities of said strip being closed or not as desired. A piece of woolen yarn or other suitable material $f^1$ is also preferably secured in the folded or bent strip $f$ so that when the inner part or support $d$ is slid into the outer part or wrapper $c$ the folded or bent strip $f$ and the woolen yarn or other suitable material $f^1$ contact therewith and overlapping the end of the outer part or wrapper $c$ constitute a light-tight joint thereby protecting the plate or plates or their equivalent P from the light. A suitable catch $g$ which may be in the form of a tab or projection having a small hole or opening $h$ is fitted to the end of the stiff or rigid support $d$ carrying the folded or bent strip $f$ and is for the purpose of securing the inner part or support $d$ of the plate envelop or holder in place in the dark slide.

In order to secure the plates or their equivalent P in position on the inner part or support $d$ the center portion thereof $i$ is made of cardboard or other suitable material so as to constitute a central support for the plate or its equivalent P and strips of paper or other suitable material $j$ are secured to the central support $i$ being bent over as shown in Fig. 13 to grip the plates P indicated in section in that figure. As shown in Fig. 12, one of the strips $j$ is preferably hingedly secured to the central support $i$ in such manner that it may be partially removed, as indicated in dotted lines, for the purpose of facilitating the insertion of the plates or their equivalent in place and it is made somewhat longer than the other support $j$, as indicated at $j^1$, being closed at its extremity so that when the plates P are inserted the closed extremity grips the plates P and aids in retaining them in position. If desired, as shown in Fig. 14$^a$, both supports $j$ (indicated in dotted lines) may be made removable and closed at both ends so that they can be pushed into place over the edges of the plates P and the central support $i$. With this arrangement small notches $j^2$ would be formed on the central support $i$ next to the folded or bent strip $f$ to enable the supports $j$ to be pushed into place.

Figs. 15 and 16 show a slightly modified construction of inner part or support $d$ of the envelop or holder. In this arrangement the inner part or support $d$ is made from one piece of suitable opaque or non-actinic material having its edges folded over at $j$. To render the inner part or support $d$ ready for the reception of the plates or their equivalent it is folded or bent at $l$ (see dotted line) so as to assume the form illustrated in full lines in Fig. 16. The tab $g$ is then secured between the two thicknesses of the inner part or support by means of an adhesive and the plates can be readily inserted and held in place by the bent over edges $j$.

In Figs. 17 and 18 a further modification of the inner part or support $d$ is illustrated. This modification is somewhat similar to the construction shown in Figs. 15 and 16 but in place of being constituted of one piece of material bent or folded at the center, it is formed of two pieces which are secured together at one end along with the tab $g$. In this arrangement one end of each half of the inner part or support $d$ is made slightly longer at $m$ so that it can be folded or tucked in between the two halves as illustrated. By making the end $m$ in this manner it serves to stiffen the inner part or support $d$, the plates or their equivalent P being held in place by means of the bent over portions $j$.

In order that the method of using the plate envelop or holder may be readily understood I will now describe in detail that portion of my invention which relates to the dark slide. The frame-work $a$ of the dark slide which is made with a rebate or the like $n$ has a projection or catch or its equivalent $o$ at one end which projection or catch engages with the tab or projection $g$ of the inner part or support $d$ of the plate envelop or holder when the latter is placed in position in the frame-work $a$, the arrangement being such that when the hinged back $b$ of the dark slide is opened and the plate envelop or holder inserted the back can then be closed, the plate envelop or holder being held securely in place, the closed end $c^1$ of the outer part or wrapper $c$ of the envelop or holder being somewhat longer than the inner part $d$, projecting a short distance beyond the exterior of the framework $a$. The interior surface of the hinged back $b$ of the dark slide is made with a sliding shutter $p$ having two projections $p^1$ (see Figs. 9 and 10) which, when the hinged back $b$ is closed, contact with the projections or catches $e$ formed on the edges of the outer part or wrapper $c$ of the plate envelop or holder. When it is desired to use the dark slide it is placed in the back of the camera, in the usual manner, with the sliding shutter $p$ closed, as indicated in Figs. 5 and 7. The sliding shutter $p$ and the projecting portion $c^1$ of the outer part or wrapper $c$ of the envelop or holder are then gripped with the finger and thumb and pulled out as far as possible, as indicated in Figs. 6 and 8, thereby uncovering the plate or its equivalent P ready for exposure. When the exposure is made, the sliding shutter $p$ only, is pushed back again, the projections $p^1$ thereon contacting with the projections $e$ on the outer part or wrapper $c$ of the plate holder causing it to be pushed back over the plate or its equivalent P as indicated in Fig. 9, until it once more contacts with the folded or bent strip $f$ at the end of the inner part $d$ which supports the plate or its equivalent P. When this operation is completed the plate or its equivalent P is again protected from the light as indicated in Figs. 5, 7 and 10, and the envelop or holder can be removed from the dark slide, reversed and reinserted preparatory to making the second exposure, when two plates or their equivalent are contained in the one envelop or holder. As already mentioned, if desired, each envelop or holder may only carry one plate or its equivalent but in order to lessen the number of envelops required two are preferably carried.

In order to obviate excessive frictional contact between the envelop or holder and the dark slide when the outer part or wrapper $c$ is pulled out to uncover the plate or its equivalent P, the inner end of the envelop or holder normally rests lightly on a movable projection or pin or its equivalent $q$ fitted in the dark slide thereby retaining the envelop or holder out of contact with the rabbet or the like $n$ of the slide. When the outer part or wrapper $c$ and the sliding shutter $p$ of the dark slide are pulled out to their full extent, as in Figs. 6 and 8, the inner part $d$ of the plate envelop or holder is then automatically pressed into contact with the rabbet $n$ of the slide through the medium of the movable projection or pin $q$ and the means for operating same thereby bringing the plate or its equivalent P into proper register.

The movable projection or pin $q$ and the means for operating same are shown clearly in Figs. 7, 7ª, 8 and 8ª, and, as shown, the mechanism consists of the movable projection or pin $q$ which is capable of partial rotation and is pivotally fitted on a pin $q^1$ secured to the hinged back $b$. It has a notch or the like $r$ at its lower end which contacts with a fixed tooth or projection $s$ secured to the hinged back $b$ so that when the projection or pin $q$ is partially rotated it will rise slightly as indicated in Figs. 4, 6 and 8, when it contacts with the tooth or projection $s$ thereby pressing the envelop or holder into contact with the rabbet $n$ and at the same time compressing a plate spring $s^1$ or its equivalent fitted behind the projection or catch $e$. The projection or pin $q$ has a cam or its equivalent $t$ secured to it, said cam having a slot $t^1$ in which works a pin $t^3$ forming part of a lever or the like $t^2$ which is slidably connected to the hinged back $b$ of the dark slide as shown in Fig. 2.

In order that the shutter $p$ may be pulled out to its full extent before the envelop or holder is raised to bring it into register or in other words to bring it into contact with the rabbet $n$ of the slide, and thereby obviate frictional contact between the shutter $p$ and the envelop or holder, during the opening of the shutter, the sliding lever $t^2$ is made with a recess $t^4$ at its outer end while the shutter $p$ has secured to it one end of a spring $t^8$ having, as shown clearly in Figs. 8 and 8ª, toes or projections $t^5$ and $t^6$, the projection $t^5$ being arranged to slide over the lever $t^2$ when the shutter is withdrawn until it enters the recess $t^4$ and automatically engages same which operation takes place just before the shutter $p$ has been pulled out to its full extent, the further small outward movement of the shutter $p$ thereupon causes the lever $t^2$ to be moved along with the shutter owing to the toe or projection $t^5$ engaging the recess $t^4$. The arrangement is such that when the shutter $p$ is pulled out to its full extent, as indicated in Figs. 2, 4, 6 and 8, the projection or pin $q$, through the movement of the pin $t^3$ in the slot $t^1$ caused by the movement of the lever $t^2$ when the shutter $p$ is pulled out, is partially rotated and rises slightly when it contacts with the fixed tooth or projection $s$, against the action of the plate spring or its equivalent $s^1$. When raised, the projection or pin $q$ presses on the tab or projection $g$ of the plate envelop or holder which is supported on said projection or pin thereby bringing the plate at the inner end of the dark slide into register. A plate spring or its equivalent $v$ is also fitted to the outer end of the dark slide and this spring normally occupies the position illustrated at Figs. 5 and 7, so that the envelop or holder at that end is not pressed against the rabbet $n$ of the dark slide and the outer part or wrapper $c$ of the envelop or holder can be readily withdrawn with the shutter $p$ without frictional contact with the rabbet of the slide until the shutter $p$ is pulled out to its full extent, whereupon, a pin or projection $w$ fitted on the cross-piece $p^1$ secured to the interior surface of the shutter $p$ contacts with the lower surface of the spring $v$ and presses same upward thereby raising the outer end of the envelop or holder and bringing the plate or its equivalent $p$ into register as illustrated at Figs. 6 and 8.

When the shutter $p$ is closed again after the exposure has been made the inward movement of the shutter through the medium of the lever $t^2$ which is actuated by the toe or projection $t^5$ immediately reverses the direction of movement of the slotted cam or its equivalent $t$ and the projection or pin $q$ is lowered, the movement being assisted by the spring $s^1$ while at the same time the pin or projection $w$ moves away from the plate spring or its equivalent $v$ and allows same to resume its normal position so that the plate P with its envelop or holder moves out of frictional contact with the rabbet of the slide. Under further movement of the shutter $p$, the projection $t^6$ contacts with a pin $t^7$ secured to the back $b$ (see Fig. 2) and overrides same, the contacting surfaces being suitably beveled or rounded for this purpose, thereby raising the projection $t^5$ which, as already stated is formed on the same spring $t^8$, out of the recess $t^4$ so that further inward movement of the shutter $p$ causes the outer part or wrapper $c$ of the envelop or holder to be pushed back again over the plate P or its equivalent, as already described.

Figs. 19 to 22 illustrate another slightly modified construction of plate envelop or holder whereby the loading of same is facilitated while a more efficient light-tight joint between the outer part or wrapper $c$ and the inner part or support $d$ is insured. With this modified construction there is also provided exposure indicating means whereby the operator can tell at a glance whether the plate or its equivalent has been exposed, such exposure indicating means being automatically operated by the actuation of the shutter of the dark slide in which the envelop or holder is placed or by the actuation of the outer part or wrapper preparatory to making the exposure. This exposure indicating means while only illustrated with reference to the modified construction illustrated at Figs. 19 to 22 can, as will be readily understood, be applied equally well to the other constructions of plate envelop or holder previously described.

In the construction of plate envelop or holder illustrated in Figs. 19 to 22 the end $f$ of the inner part or support $d$ is preferably made of wood, grooved or recessed, as shown clearly in Fig. 22 and to this end are secured flexible bent strips of paper, thin cardboard or such like $j$ for gripping the plates or their equivalent P. These bent strips are closed at their extremities by pieces of wood or other suitable material $j^1$ so that when the plates or their equivalent P are inserted the closed extremities grip the plates thereby retaining them in position. The central support $i$ in this arrangement is not attached to the end $f$ but is capable of being removed with the plates P. The end of the central support $i$ and the ends of the plates or their equivalent P not in contact with the extremities $j^1$ rest against a folded or bent strip of paper, thin cardboard or other suitable material $f^1$ which is inserted in the groove or recess in the end $f$ of the inner part or support $d$ and constitutes a light-tight joint between the inner part or support $d$ and the outer part or wrapper $c$. As illustrated in Fig. 22 the folded or bent strip of paper, thin cardboard or other suitable material $f^1$ is placed over a central web or the like $f^2$ formed in the groove or recess of the end $f$ and having a certain springiness or resiliency constitutes an efficient light-tight joint between the parts when the outer part or wrapper $c$ is pushed into place. As an additional precaution against the entrance of light, the extremities of the end $f$ to which the strips $j$ are secured, may, if desired, be covered with non-actinic paper or other suitable material as indicated at $f^3$. Only one extremity is shown covered.

One arrangement of the exposure indicating means is illustrated in Fig. 19 and consists of a guide piece $x^1$ secured to the exterior of the outer part or wrapper $c$ and having a piece of colored paper or other suitable material $x$ inserted therein so that a portion thereof is exposed through an opening $x^2$. A pin or like projection from the rabbet $n$ of the framework $a$ is positioned to engage with the paper or other material $x$ outside the opening in the guide $x^1$ as the outer part or wrapper $c$ is being withdrawn preparatory to making an exposure, and detaches same, and its removal will thereafter indicate to the operator that the plate or its equivalent P has been exposed thereby obviating the likelihood of a double exposure being made. The external surface of the outer part or wrapper $c$ may be colored or marked in such manner that when the tongue or its equivalent $x$ is removed a portion of the wrapper $c$ is clearly visible to the operator through an opening $x^2$ made in the guide piece $x^1$, and forms an additional protection against double exposures.

Having now fully described my invention, what I claim and desire to secure by Letters Patent is:—

1. A daylight loading photographic dark slide provided with a movable shutter, having combined therewith a plate support, a wrapper for the plate for use in connection with the support and capable of being moved with the shutter, means for holding and retaining the support in the dark slide, and means adapted to act automatically with respect to the movements of the shutter for moving the support into and out of register.

2. A daylight loading photographic dark slide provided with a movable shutter, having combined therewith a support for a sensitized medium, a wrapper for the sensitized medium for use in connection with the support and capable of being moved with the shutter, means for holding and retaining the support in the dark slide, and means adapted to act automatically with respect to the movements of the shutter for moving the support into and out of register.

3. A daylight loading photographic dark slide provided with a sliding shutter, having combined therewith a support for a plurality of sensitized mediums, a wrapper for the sensitized mediums for use in connection with the support and capable of being moved with the shutter, means for holding and retaining the support in the dark slide, and means adapted to act automatically with respect to the movements of the shutter for moving the support into and out of register.

4. A daylight loading photographic dark slide comprising a framework, a hinged back and a sliding shutter, a support for a sensitized medium, a wrapper for the sensitized medium for use in connection with the support and capable of being moved with the shutter, and means on the dark slide and on the sensitized medium support adapted to act automatically with respect to the movements of the shutter for adjusting the support so as to permit of the free operation of the dark slide.

5. A daylight loading photographic dark slide provided with a movable shutter, having combined therewith a sensitized medium holder comprising an inner part supporting the sensitized medium and an outer part longer than the sensitized medium, means on the inner part for constituting a light-tight joint between the inner and outer parts, means on the inner part and means on the dark slide adapted to act automatically with respect to the movements of the shutter for moving the inner part supporting the medium into and out of register.

6. A daylight loading photographic dark slide provided with a movable shutter, having combined therewith a sensitized medium holder comprising an inner part supporting the sensitized medium and an outer part longer than the sensitized medium, means on the inner part for constituting a light-tight joint between the inner and outer parts, means on the inner part and means on the dark slide adapted to act automatically with respect to the movements of the shutter for moving the inner part supporting the medium into and out of register, and exposure indicating means on the outer part.

7. A daylight loading photographic dark slide provided with a movable shutter having combined therewith a sensitized medium holder comprising an inner part supporting the sensitized medium and an outer part longer than the sensitized medium, means on the inner part for constituting a light-tight joint between the inner and outer2 parts, means on the inner part and means on the dark slide adapted to act automatically with respect to the movements of the shutter for moving the inner part supporting the medium into and out of register, and exposure indicating means on the outer part automatically operated by the operation of the dark slide.

8. A daylight loading photographic dark slide comprising a framework, a hinged back and a sliding shutter; a sensitized medium holder comprising an inner part supporting the sensitized medium and an outer part longer than the sensitized medium, means on the inner part for constituting a light-tight joint between the inner and outer parts, means on the inner part and means on the dark slide adapted to act automatically with respect to the movements of the shutter for moving the inner part supporting the medium into and out of register.

9. A daylight loading photographic dark slide comprising a framework, a hinged back and a sliding shutter; a sensitized medium holder comprising an inner part supporting the sensitized medium and an outer part longer than the sensitized medium, means on the inner part for constituting a light-tight joint between the inner and outer parts, means on the inner part and means on the dark slide adapted to act automatically with respect to the movements of the shutter for moving the inner part supporting the medium into and out of register, and exposure indicating means on the outer part.

10. A daylight loading photographic dark slide comprising a framework, a hinged back and a sliding shutter; a sensitized medium holder comprising an inner part supporting the sensitized medium and an outer part longer than the sensitized medium, means on the inner part for constituting a light-joint between the inner and outer parts, means on the inner part and means on the dark slide adapted to act automatically with respect to the movements of the shutter for moving the inner part supporting the medium into and out of register, and exposure indicating means on the outer part automatically operated by the operation of the dark slide.

In testimony whereof I affix my signature in presence of two witnesses.

JAMES DONALD.

Witnesses:
WILLIAM FLEMING,
SYDNEY CHAPMAN.